Feb. 13, 1951  G. CORNELIUS  2,541,208
COUPLING MEANS FOR IRRIGATION PIPES
Filed March 25, 1950
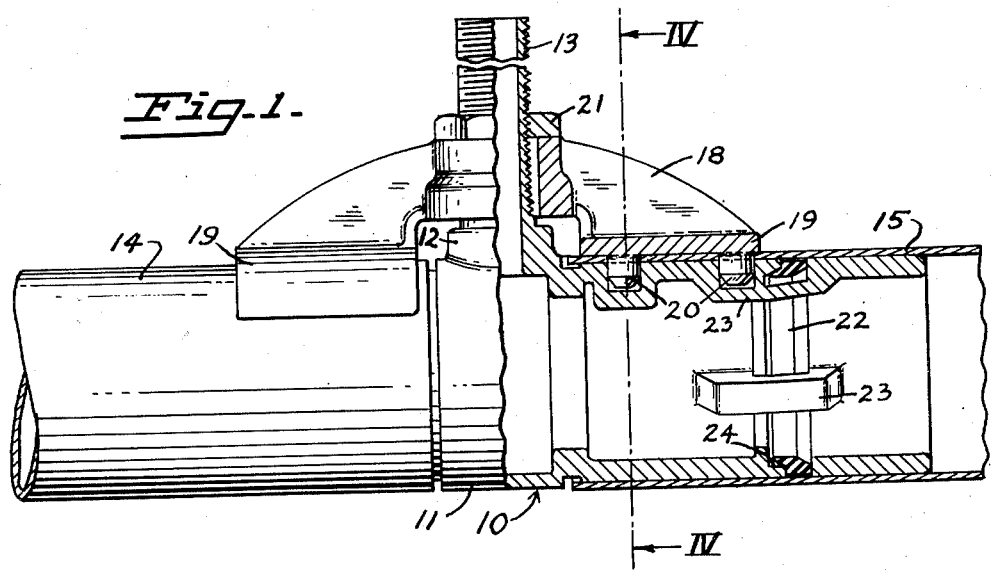
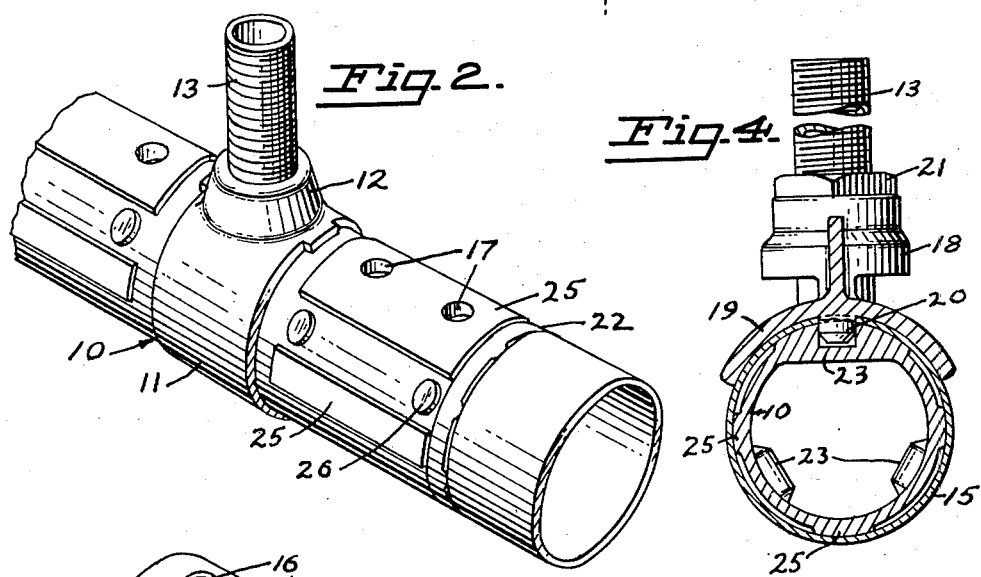
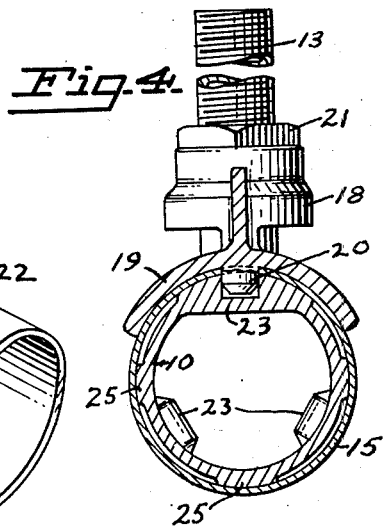
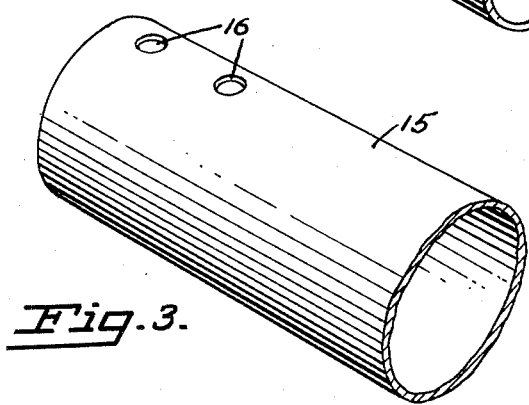
INVENTOR.
GAIL CORNELIUS
BY
Charles M Fryer
ATTORNEY Patented Feb. 13, 1951

2,541,208

UNITED STATES PATENT OFFICE 2,541,208

COUPLING MEANS FOR IRRIGATION PIPES

Gail Cornelius, Portland, Oreg., assignor to R. M. Wade & Co., Portland, Oreg., a corporation of Oregon Application March 25, 1950, Serial No. 151,979

3 Claims. (Cl. 285—108)

This invention relates to coupling means for irrigation pipe or the like that is designed for use above the surface of the ground and adapted to be moved between various locations to be irrigated.

The invention is concerned particularly with systems of the kind used in sprinkler type irrigation wherein the pipe is moved in long sections consisting of several connected pipe lengths as distinguished from the method where but one or two lengths are moved at a time. The moving of several pipe lengths sometimes totaling five hundred feet or more is customarily accomplished by a tractor which drags the pipe over the field from one location to the next. It is necessary, therefore, that the couplings employed for connecting the pipe lengths be able to withstand considerable longitudinal stress without breaking or parting and that they be simple in design particularly on their outer sides so that any hindrance to the sliding of the pipe over the surface of the ground is reduced to a minimum.

It is also necessary that the couplings be capable of including some sealing means designed to withstand pressure from within the pipe and it is desirable that the sealing means be self draining when the pressure from within is reduced. The requirement for these features is best appreciated from an understanding of a typical use of the long length or "tractor move" type of irrigation system. For example, a relatively permanent or main pipe line is disposed along one boundary of a field to be irrigated and has spaced outlets for the connection of a branch line adapted to extend across the field toward the opposite boundary. This branch line carries spaced sprinkler outlets and it is connected one after another with the spaced outlets of the main line so that the entire field will be irrigated. The branch line is moved from one outlet to the next by valving off its supply of water and then dragging it in sections of suitable lengths to position for connection to the next outlet. As the weight of the water in the line hinders its movement and as the line often lies upon uneven or rolling terrain, it is desirable to drain the line at each coupling immediately upon the failure of pressure resulting from its being valved off in preparation for moving. This system of draining is also superior to end draining because the discharge of a large volume of water at any single point is detrimental to certain types of crops and produces a muddy spot undesirable in cultivated fields.

The present application is concerned with the coupling means for mechanically connecting the ends of pipe lengths and one of the desirable features of the coupling disclosed herein is its receptability to a novel sealing and self-draining means. The latter means, however, is disclosed in detail and claimed in my co-pending application entitled "Sealing and Self-Draining Means for Pipe Couplers," filed March 25, 1950, Serial No. 151,980.

The object of the present invention is to provide a pipe coupling means of simple, durable and inexpensive construction capable of withstanding a high longitudinal stress such as imposed by dragging a pipe line and capable of assembly and dis-assembly in a simple and efficient manner.

Further objects and advantages of the invention are made apparent in the following specification wherein the invention is described in detail by reference to the accompanying drawings.

In the drawings:

Fig. 1 is a view, one-half in side elevation and one-half in central vertical section, of a pipe coupling embodying the present invention and illustrated with the adjacent ends of two lengths of pipe connected therewith.

Fig. 2 is a fragmentary perspective view showing the same pipe coupling with the pipe ends and connecting yoke member removed therefrom, Fig. 3 is a fragmentary perspective view showing one end of a length of pipe adapted to be connected with the coupling shown in Fig. 2, and Fig. 4 is a sectional view taken on the line IV—IV of Fig. 1.

The coupling comprises a main coupling member generally indicated at 10 of substantially tubular shape. The central portion of this coupling member 10 is slightly enlarged as indicated at 11 and has a boss 12 formed thereon which is perforated and threaded for the reception of an exteriorly threaded stand pipe. The stand pipe 13 serves to support and direct water to a sprinkler head not shown and also serves in the assembly of the coupling as will presently appear.

The ends 14 and 15 of two lengths of pipe to be connected by the coupling are shown in assembled relationship therewith in Fig. 1. The ends of the pipe slip over the tubular ends of the coupling and are provided each with a pair of perforations 16, as best shown in Fig. 3, adapted to register with depressions 17 in the coupling (see Fig. 2) when the pipe is in place thereon. A yoke member 18 has a central opening which fits over the stand pipe 13 and two saddle-like parts 19 overlying the ends of the pipe when it is assembled with the coupling. A pair of studs 20 is formed on each of the saddle parts 19 to project through the holes 16 in the pipe and into the depressions 17 in the coupling, thus preventing separation of the pipe from the coupling. A lock nut 21 is threaded on the stand pipe 13 and may be turned down against the top of the yoke 18 to complete the assembly and securely hold all of the parts in their assembled positions.

To form a fluid tight connection between the cylindrical ends of the coupling and the end of the length of pipe which is slipped over it, a gasket 22 is assembled in a slot which completely circumscribes the coupling so that the coupling would be cut off or separated adjacent its ends except for internally formed bridge-like members 23 spanning the slot which receives the gasket. Pressure from within the coupling urges the gasket outwardly into fluid tight connection with the interior of the pipe and with a shoulder 24 formed in the slot which receives the gasket. However when the pipe is to be moved and the pressure is reduced, water is free to escape through the slot around the gasket and through suitable spaces between the coupling and the end of the pipe. These spaces are provided through the structure best illustrated in Figs. 2 and 4 wherein the coupling between the gasket 22 and the end of the pipe is shown as slightly smaller in diameter than the interior of the pipe but as having raised portions thereon to fit closely and provide a relatively tight sliding connection. The raised portions may be, as shown, in the form of elongated pads 25 and smaller suitably spaced pads 26 providing passageways through which the water may freely flow between the gasket and the end of the pipe.

The structure and operation of the gasket is set forth in greater detail in the co-pending application hereinabove referred to.

With the coupling means herein illustrated, a small number of simple and inexpensive parts is utilized to provide a coupling between the pipe ends which have relatively high rigidity and resistance to longitudinal stresses. The coupling may be easily disassembled for setting up pipe lines of different lengths by loosening the lock nut 21 but until such nut is loosened, it is positively held in assembled position by the studs 20 which pass through the perforations in the ends of the pipe.

I claim:

1. A pipe coupling having a tubular body member with generally cylindrical ends adapted to be received by the ends of pipes to be coupled, said pipe ends having perforations therein, said cylindrical ends having depressions registering with said perforations, a single member carrying lugs for extending through said perforations and into said depressions, and means to secure said member in place on the coupling.

2. A pipe coupling having a tubular body member with generally cylindrical ends for reception by the ends of pipes to be coupled, a threaded member extending at a right angle from the central portion of the coupling, a yoke embracing the threaded member and having two ends adapted for interlocking engagement with the coupling and the pipe ends, and a nut on said threaded member to urge the yoke into engagement with the pipe ends.

3. A pipe coupling having a tubular body member with generally cylindrical ends for reception by the ends of pipes to be coupled, a threaded stand pipe extending outwardly from the central portion of the coupling, a yoke embracing the stand pipe, a nut threaded on the stand pipe to urge the yoke toward the coupling, and means on the ends of the yoke to form an interlocking engagement between the ends of the pipe and the ends of the coupling.

GAIL CORNELIUS.

No references cited.